United States Patent
Nagayama et al.

(10) Patent No.: US 10,668,808 B2
(45) Date of Patent: Jun. 2, 2020

(54) DRIVING FORCE CONTROL APPARATUS AND METHOD FOR CONTROLLING VEHICLE

(71) Applicant: JTEKT CORPORATION, Osaka-shi (JP)

(72) Inventors: Go Nagayama, Toyama (JP); Kotaro Sarai, Nishio (JP); Tetsuya Yamazaki, Tokai (JP); Ichiro Oda, Toyokawa (JP)

(73) Assignee: JTEKT CORPORATION, Osaka-shi (JP)

( * ) Notice: Subject to any disclaimer, the term of this patent is extended or adjusted under 35 U.S.C. 154(b) by 76 days.

(21) Appl. No.: 16/113,024

(22) Filed: Aug. 27, 2018

(65) Prior Publication Data

US 2019/0061523 A1    Feb. 28, 2019

(30) Foreign Application Priority Data

Aug. 28, 2017 (JP) .................................. 2017-163489

(51) Int. Cl.
*B60K 23/04* (2006.01)
*F16H 48/19* (2012.01)
*F16H 48/36* (2012.01)

(52) U.S. Cl.
CPC ............. *B60K 23/04* (2013.01); *F16H 48/19* (2013.01); *F16H 48/36* (2013.01); *B60K 2023/043* (2013.01)

(58) Field of Classification Search
None
See application file for complete search history.

(56) References Cited

U.S. PATENT DOCUMENTS

| 5,103,925 A * | 4/1992 | Imaseki ................ B60T 8/1755 180/415 |
| 5,742,917 A * | 4/1998 | Matsuno ............ B60K 17/3462 180/197 |
| 2011/0087409 A1* | 4/2011 | Severinsson ......... B60K 17/165 701/58 |
| 2014/0058643 A1 | 2/2014 | Kodama |
| 2017/0183008 A1* | 6/2017 | Isono ...................... B60L 15/20 |
| 2018/0237014 A1* | 8/2018 | Nasu ........................ B60K 1/02 |

FOREIGN PATENT DOCUMENTS

JP         2014-40852         3/2014

* cited by examiner

*Primary Examiner* — Timothy Hannon
(74) *Attorney, Agent, or Firm* — Oblon, McClelland, Maier & Neustadt, L.L.P.

(57) ABSTRACT

A driving force control apparatus includes a first torque calculator configured to calculate turning radius correspondence torques indicating the magnitudes of the driving forces to be transmitted to a right rear wheel and a left rear wheel based on a turning radius, a second torque calculator configured to calculate steering velocity response torques based on a steering velocity of a steering wheel and a vehicle speed, a corrector configured to calculate a corrected torque by correcting a turning radius correspondence torque of at least one of wheels on an inner side of turning and on an outer side of turning in accordance with the steering velocity response torque, and a current controller configured to supply currents to torque couplings so that driving forces based on the corrected torque are transmitted.

6 Claims, 7 Drawing Sheets

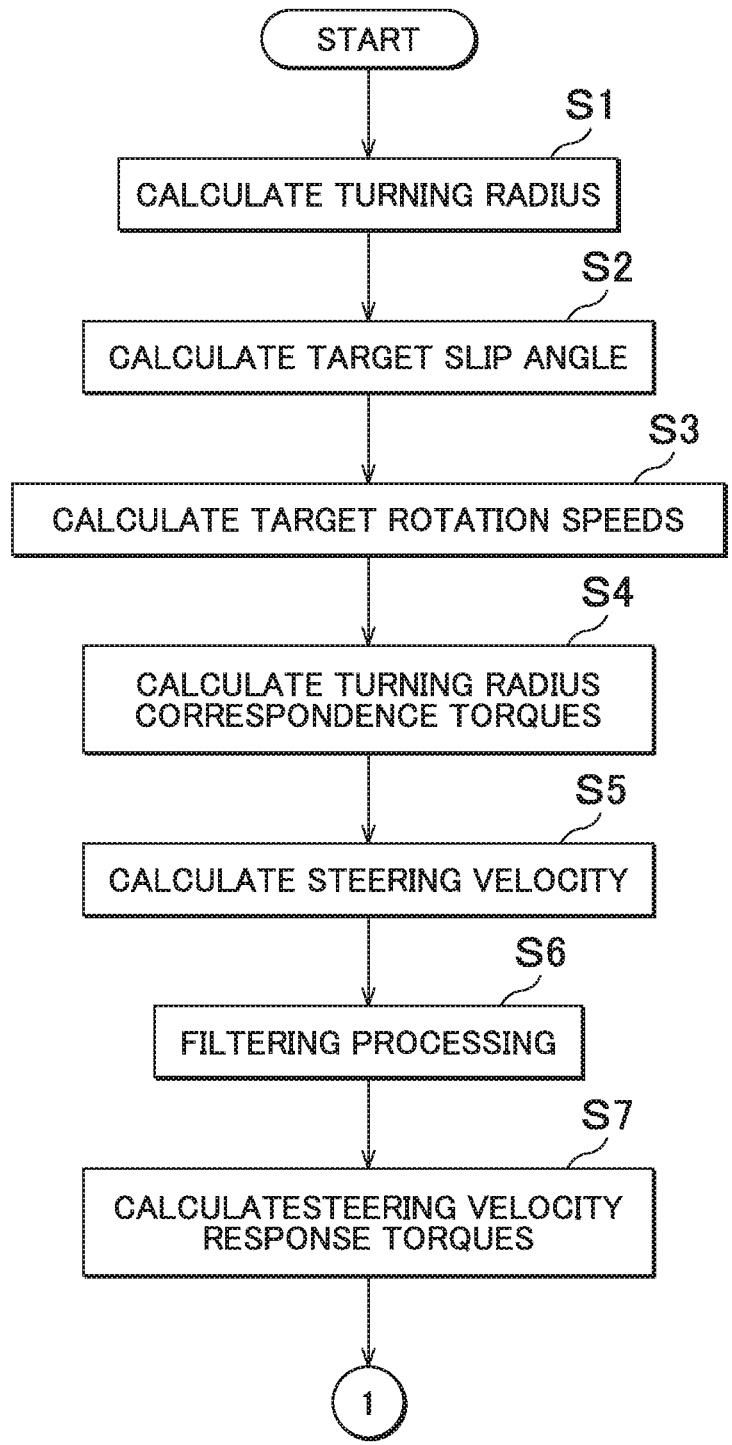

DRIVING FORCE CONTROL APPARATUS AND METHOD FOR CONTROLLING VEHICLE

INCORPORATION BY REFERENCE

The disclosure of Japanese Patent Application No. 2017-163489 filed on Aug. 28, 2017 including the specification, drawings and abstract, is incorporated herein by reference in its entirety.

BACKGROUND OF THE INVENTION

1. Field of the Invention

The present invention relates to a driving force control apparatus and a method for controlling a vehicle, which are configured to adjust driving forces to be transmitted to a right wheel and a left wheel.

2. Description of the Related Art

Hitherto, a four-wheel drive vehicle configured to adjust driving forces to be transmitted to right and left auxiliary driving wheels is provided as a four-wheel drive vehicle including a pair of right and left main driving wheels to which a driving force of a drive source is constantly transmitted and a pair of right and left auxiliary driving wheels to which the driving force is transmitted depending on traveling conditions (see, for example, Japanese Patent Application Publication No. 2014-40852 (JP 2014-40852 A)).

JP 2014-40852 A describes a driving force transmission apparatus configured to transmit driving forces to a right wheel and a left wheel on a rear wheel side that serve as auxiliary driving wheels, and a driving force control apparatus configured to control the driving force transmission apparatus. The driving force transmission apparatus includes a first torque coupling configured to transmit the driving force to the left wheel, and a second torque coupling configured to transmit the driving force to the right wheel. The second and first torque couplings transmit the driving forces to the right wheel and the left wheel based on currents supplied from the driving force control apparatus, respectively.

The driving force control apparatus includes a turning radius estimator configured to estimate a turning radius of a vehicle based on a steering angle of a steering wheel or the like, a target slip angle calculator configured to calculate a target slip angle of the right wheel and the left wheel based on the estimated turning radius, a target rotation speed calculator configured to calculate target rotation speeds of the right wheel and the left wheel based on the target slip angle and a vehicle speed, and a driving force controller configured to control driving forces to be transmitted to the right wheel and the left wheel so that the actual rotation speeds of the right wheel and the left wheel are closer to the target rotation speeds.

According to the driving force control apparatus described in JP 2014-40852 A, the turning performance can be improved as compared to a case where the driving forces to be transmitted to the right wheel and the left wheel are controlled based on, for example, a yaw rate generated when the vehicle makes a turn. In a case of, for example, a relatively heavy vehicle, however, a time delay is significant from the adjustment of the driving forces to be transmitted to the right wheel and the left wheel to a change in behavior of the vehicle. Thus, the effect of improving the turning performance is not necessarily attained sufficiently.

SUMMARY OF THE INVENTION

It is one object of the present invention to provide a driving force control apparatus and a method for controlling a vehicle, which are configured to adjust driving forces to be transmitted to a right wheel and a left wheel to promptly change the behavior of the vehicle, whereby the turning performance can be improved.

A driving force control apparatus according to one aspect of the present invention is a driving force control apparatus to be mounted on a vehicle including a driving force transmission apparatus including a driving force adjustment mechanism configured to adjust driving forces to be transmitted to a right wheel and a left wheel. The driving force control apparatus is configured to control the driving force transmission apparatus.

The driving force control apparatus includes:

a first torque calculator configured to calculate turning radius correspondence torques indicating magnitudes of the driving forces to be transmitted to the right wheel and the left wheel based on at least a vehicle turning radius;

a second torque calculator configured to calculate a steering velocity response torque based on a steering velocity of a steering wheel and a vehicle speed;

a corrector configured to calculate a corrected torque by correcting a turning radius correspondence torque of a wheel on an inner side of turning out of the turning radius correspondence torques of the right wheel and the left wheel that are calculated by the first torque calculator so that the turning radius correspondence torque of the wheel on the inner side of turning decreases in accordance with the steering velocity response torque; and a current controller configured to supply, to the driving force transmission apparatus, a current for operating the driving force adjustment mechanism so that a driving force based on the corrected torque is transmitted to the wheel on the inner side of turning.

According to the driving force control apparatus of the aspect described above, a time delay is reduced from a steering operation of the steering wheel to a change in the behavior of the vehicle through the adjustment of the driving forces to be transmitted to the right wheel and the left wheel. Thus, the turning performance can be improved.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein:

FIGS. 6A and 6B include a flowchart illustrating an example of a procedure of processing to be executed by a control unit.

DETAILED DESCRIPTION OF EMBODIMENTS

Figure 1:
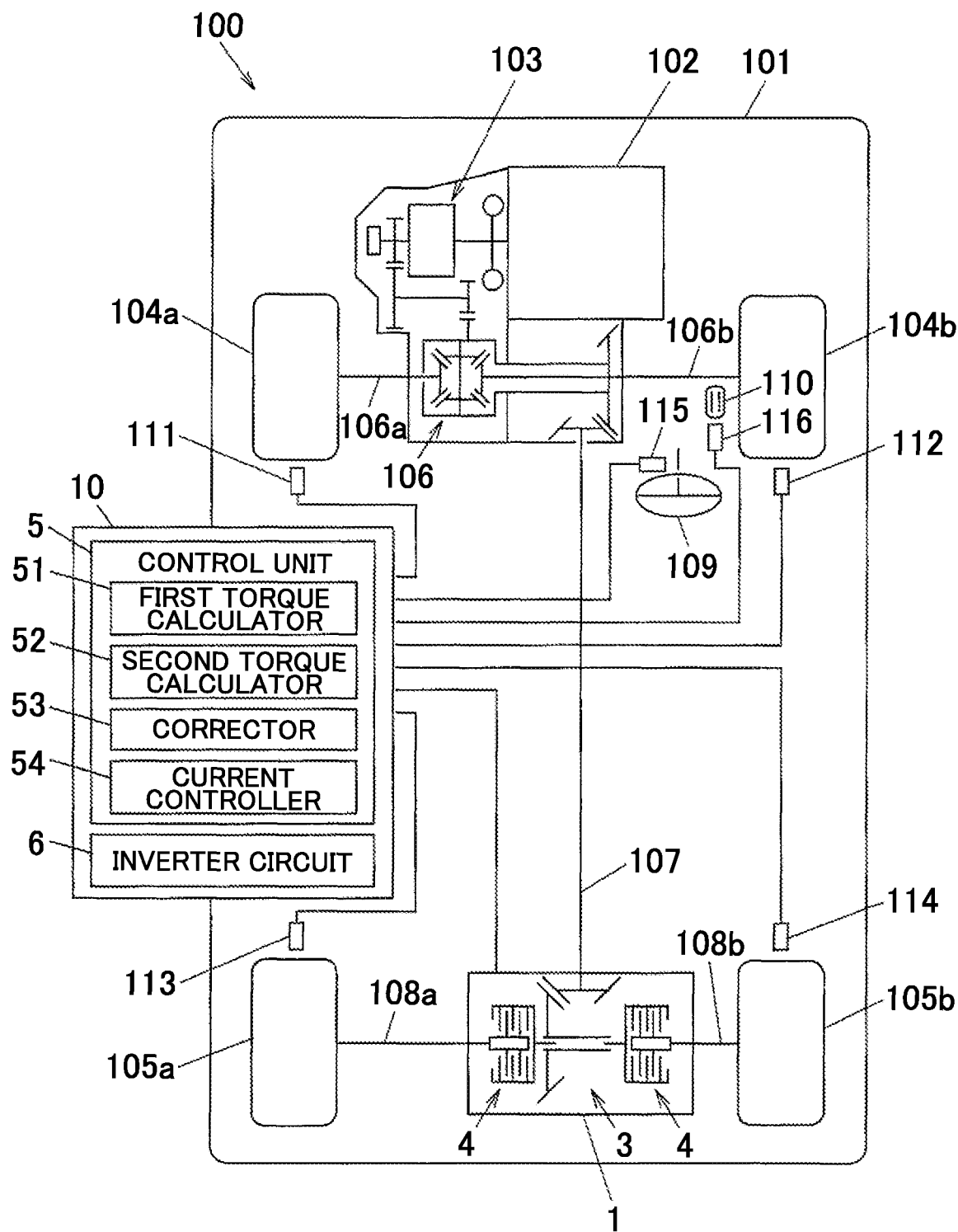
FIG. 1 is a schematic configuration diagram illustrating an example of the configuration of a four-wheel drive vehicle according to an embodiment of the present invention.

An embodiment of the present invention is described with reference to FIG. 1 to FIG. 6B. FIG. 1 is a schematic configuration diagram illustrating an example of the overall configuration of a four-wheel drive vehicle according to the embodiment of the present invention. As illustrated in FIG. 1, a four-wheel drive vehicle 100 includes a vehicle body 101, an engine 102, a transmission 103, right and left front wheels 104b and 104a, and right and left rear wheels 105b and 105a. The engine 102 serves as a drive source. The right and left front wheels 104b and 104a serve as a pair of right and left main driving wheels to which a driving force of the engine 102 is constantly transmitted. The right and left rear wheels 105b and 105a serve as a pair of right and left auxiliary driving wheels to which the driving force of the engine 102 is transmitted in a disconnectable manner depending on traveling conditions.

The four-wheel drive vehicle 100 further includes a front differential 106, a propeller shaft 107, and a driving force transmission apparatus 1 as a driving force transmission system. The driving force of the engine 102 that is obtained through speed variation executed by the transmission 103 is constantly transmitted to the right and left front wheels 104b and 104a via the front differential 106 and a pair of drive shafts 106b and 106a, respectively. The right and left front wheels 104b and 104a are steered wheels to be turned through a driver's steering operation of a steering wheel 109.

The driving force of the engine 102 that is obtained through speed variation executed by the transmission 103 is transmitted to the right and left rear wheels 105b and 105a via the propeller shaft 107, the driving force transmission apparatus 1, and a pair of drive shafts 108b and 108a, respectively. The driving force transmission apparatus 1 is configured to independently adjust a driving force to be transmitted to the right rear wheel 105b serving as a right wheel and a driving force to be transmitted to the left rear wheel 105a serving as a left wheel. The structure of the driving force transmission apparatus 1 is described later.

A driving force control apparatus 10 is mounted on the four-wheel drive vehicle 100. The driving force control apparatus 10 independently controls the driving forces to be transmitted to the right rear wheel 105b and the left rear wheel 105a by the driving force transmission apparatus 1. The driving force control apparatus 10 includes a first torque calculator 51, a second torque calculator 52, a corrector 53, and a current controller 54. Details of the driving force control apparatus 10 are described later.

The driving force control apparatus 10 is configured to acquire detection results from rotation speed sensors 111 to 114 configured to detect rotation speeds of the right and left front wheels 104b and 104a and the right and left rear wheels 105b and 105a. The driving force control apparatus 10 is configured to acquire a detection result from a steering angle sensor 115 configured to detect a rotation angle (steering angle) from a neutral position of the steering wheel 109. The driving force control apparatus 10 is configured to acquire a detection result from an accelerator operation amount sensor 116 configured to detect a depression amount of an accelerator pedal 110. The driving force control apparatus 10 controls the driving force transmission apparatus 1 based on those detection results.

Figure 2:
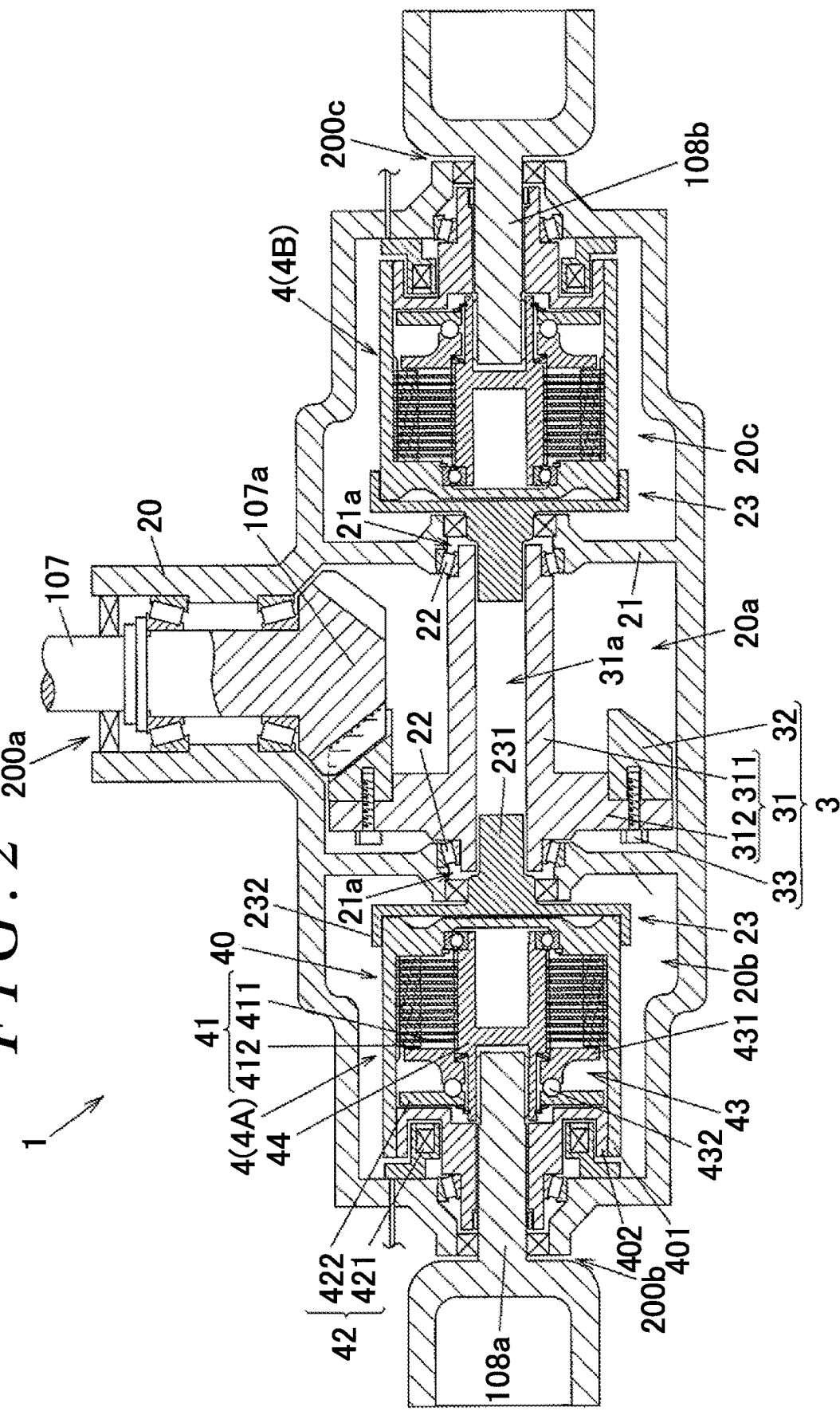
FIG. 2 is a sectional view illustrating an example of the structure of a driving force transmission apparatus.

FIG. 2 is a sectional view illustrating an example of the structure of the driving force transmission apparatus 1.

The driving force transmission apparatus 1 includes a case member 20, an input rotational member 3, and a pair of torque couplings 4. The case member 20 has first to third housing spaces 20a to 20c inside. The input rotational member 3 is housed in the first housing space 20a of the case member 20. The torque couplings 4 are housed in the second and third housing spaces 20b and 20c provided across the first housing space 20a.

The torque coupling 4 housed in the second housing space 20b and the torque coupling 4 housed in the third housing space 20c have a common structure. When distinction is necessary in the following description, the torque coupling 4 housed in the second housing space 20b is described as a first torque coupling 4A, and the torque coupling 4 housed in the third housing space 20c is described as a second torque coupling 4B.

The case member 20 is partitioned by a pair of partition walls 21 between the first housing space 20a and the second housing space 20b and between the first housing space 20a and the third housing space 20c. Through holes 21a are formed in the partition walls 21 so that the first housing space 20a communicates with the second and third housing spaces 20b and 20c.

The input rotational member 3 includes a first member 31, a second member 32, and a plurality of bolts 33. The first member 31 is rotatably supported on the case member 20. The second member 32 is formed of an annular ring gear. The bolts 33 couple the first member 31 to the second member 32. The first member 31 integrally includes a tubular portion 311 and a flange portion 312. The tubular portion 311 has a cylindrical shape, and a through hole 31a is formed at its central part. The flange portion 312 is formed so as to protrude outward from the outer peripheral surface of the tubular portion 311. The second member 32 is fixed to the edge of the flange portion 312, and meshes with a gear portion 107a formed at one end of the propeller shaft 107 inserted through a first opening 200a of the case member 20. The first member 31 is rotatably supported by a pair of bearings 22 arranged between the first member 31 and the inner surfaces of the through holes 21a.

The torque coupling 4 includes a multi-disc clutch 41, an electromagnetic clutch 42, a cam mechanism 43, an inner shaft 44, and a housing 40. The housing 40 houses the multi-disc clutch 41, the electromagnetic clutch 42, the cam mechanism 43, and the inner shaft 44.

The housing 40 is constituted by a first housing member 401 and a second housing member 402 that are coupled to each other so as not to be rotatable relative to each other. The first housing member 401 has a bottomed cylindrical shape. The second housing member 402 is arranged so as to close the open end of the first housing member 401.

The multi-disc clutch 41 is arranged between the first housing member 401 of the housing 40 and the cylindrical inner shaft 44. The multi-disc clutch 41 is constituted by inner clutch plates 411 and outer clutch plates 412. The inner clutch plates 411 spline-engage with the outer peripheral surface of the inner shaft 44 so as not to be rotatable relative to the inner shaft 44. The outer clutch plates 412 spline-engage with the inner peripheral surface of the first housing member 401 so as not to be rotatable relative to the first housing member 401.

The electromagnetic clutch 42 includes an annular coil 421 and an armature cam 422, and is arranged on a rotation axis of the housing 40. The electromagnetic clutch 42 is configured to move the armature cam 422 toward the coil 421 by generating an electromagnetic force with the coil 421, thereby causing the armature cam 422 to frictionally slide against the second housing member 402.

The cam mechanism 43 includes a main cam 431 and cam followers (balls) 432. The main cam 431 is arranged side by side with the armature cam 422 along the rotation axis of the housing 40. The cam followers 432 are interposed between the main cam 431 and the armature cam 422. The cam followers 432 are rollable along cam grooves formed in the armature cam 422 and the main cam 431 so as to extend in a circumferential direction. The axial depth of each cam groove gradually changes depending on its circumferential position. By energizing the coil 421, the armature cam 422 receives a rotational force from the housing 40, and the cam mechanism 43 converts the rotational force into a pressing force serving as a clutch force for the multi-disc clutch 41.

When the amount of energization of the coil 421 increases, the friction force between the armature cam 422 and the second housing member 402 increases, and the main cam 431 presses the multi-disc clutch 41 more forcefully. That is, the torque coupling 4 can variably control the pressing force for the multi-disc clutch 41 based on the amount of energization of the coil 421, and can furthermore adjust a torque transmission amount between the housing 40 and the inner shaft 44.

One end of the right rear wheel-side drive shaft 108*b* inserted through a third opening 200*c* of the case member 20 is coupled to the inner shaft 44 of the second torque coupling 4B by spline fitting so that the drive shaft 108*b* is not rotatable relative to the inner shaft 44. One end of the left rear wheel-side drive shaft 108*a* inserted through a second opening 200*b* of the case member 20 is coupled to the inner shaft 44 of the first torque coupling 4A by spline fitting so that the drive shaft 108*a* is not rotatable relative to the inner shaft 44.

The housings 40 of the first torque coupling 4A and the second torque coupling 4B and the tubular portion 311 of the first member 31 of the input rotational member 3 are coupled by a pair of coupling members 23 so as not to be rotatable relative to each other. The coupling member 23 integrally includes a columnar boss portion 231 and a disc-shaped flange portion 232. The boss portion 231 is spline-fitted to the inner surface of the through hole 31*a* of the first member 31 so as not to be rotatable relative to the first member 31. The flange portion 232 is spline-fitted to the housing 40 so as not to be rotatable relative to the housing 40. The boss portion 231 is inserted through the through hole 21*a* of the partition wall 21.

Exciting currents are supplied from the driving force control apparatus 10 to the coils 421 of the torque couplings 4. The driving force control apparatus 10 is configured to adjust the driving force to be transmitted to the right rear wheel 105*b* from the input rotational member 3 by increasing or reducing the current to be supplied to the coil 421 of the second torque coupling 4B. The driving force control apparatus 10 is also configured to adjust the driving force to be transmitted to the left rear wheel 105*a* from the input rotational member 3 by increasing or reducing the current to be supplied to the coil 421 of the first torque coupling 4A. The first torque coupling 4A and the second torque coupling 4B are one mode of a driving force adjustment mechanism configured to adjust the driving forces to be transmitted to the right rear wheel 105*b* and the left rear wheel 105*a*.

The driving force control apparatus 10 includes a control unit 5 and an inverter circuit 6. The control unit 5 includes a central processing unit (CPU) and a storage element. The CPU executes processing based on a program stored in the storage element. The inverter circuit 6 includes switching elements such as power transistors. The inverter circuit 6 switches a voltage of a DC power source such as a battery, and supplies currents to the coils 421 of the first torque coupling 4A and the second torque coupling 4B. The control unit 5 functions as the first torque calculator 51, the second torque calculator 52, the corrector 53, and the current controller 54 when the four-wheel drive vehicle 100 makes a turn.

The first torque calculator 51 calculates turning radius correspondence torques indicating the magnitudes of the driving forces to be transmitted to the right and left rear wheels 105*b* and 105*a* based on at least a turning radius of the four-wheel drive vehicle 100. The second torque calculator 52 calculates steering velocity response torques based on a steering velocity of the steering wheel 109 and a vehicle speed. The corrector 53 corrects at least one turning radius correspondence torque out of the turning radius correspondence torques of the right and left rear wheels 105*b* and 105*a* that are calculated by the first torque calculator 51. More specifically, the corrector 53 executes at least one processing out of processing of calculating a corrected torque by correcting a turning radius correspondence torque of a wheel on an inner side of turning so that the turning radius correspondence torque decreases in accordance with the steering velocity response torque calculated by the second torque calculator 52 and processing of calculating a corrected torque by correcting a turning radius correspondence torque of a wheel on an outer side of turning so that the turning radius correspondence torque increases in accordance with the steering velocity response torque calculated by the second torque calculator 52.

When the corrector 53 corrects the turning radius correspondence torque of the wheel on the inner side of turning, the current controller 54 supplies, to the driving force transmission apparatus 1, currents for operating the first and second torque couplings 4A and 4B so that a driving force based on the corrected torque calculated by the corrector 53 is transmitted to the wheel on the inner side of turning. When the corrector 53 corrects the turning radius correspondence torque of the wheel on the outer side of turning, the current controller 54 supplies, to the driving force transmission apparatus 1, currents for operating the first and second torque couplings 4A and 4B so that a driving force based on the corrected torque calculated by the corrector 53 is transmitted to the wheel on the outer side of turning.

Figure 3:
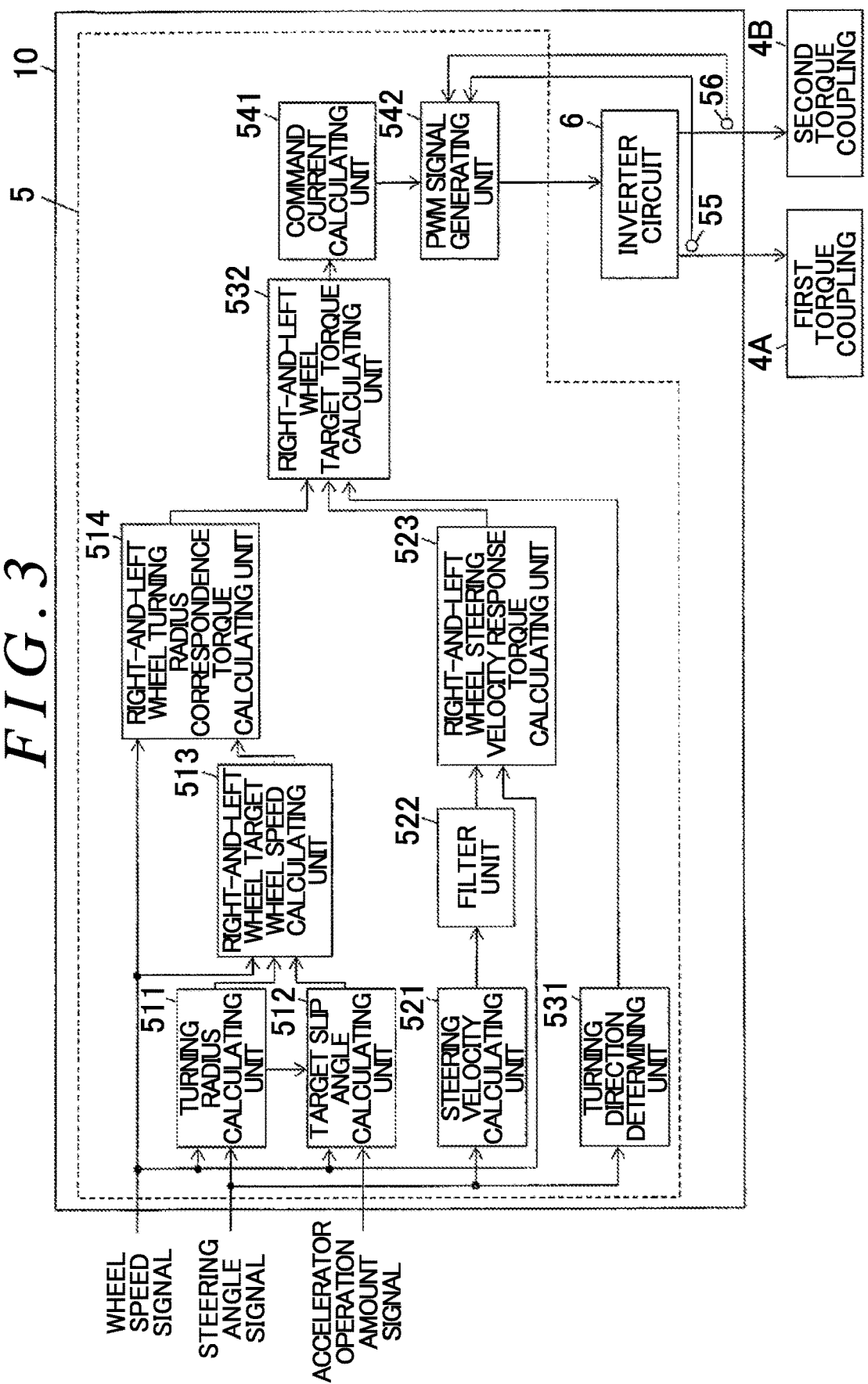
FIG. 3 is an explanatory block diagram illustrating an example of the control configuration of a driving force control apparatus.

FIG. 3 is an explanatory block diagram illustrating an example of the control configuration of the driving force control apparatus 10. In this block diagram, processing to be executed by each of a turning radius calculating unit 511, a target slip angle calculating unit 512, a right-and-left wheel target wheel speed calculating unit 513, and a right-and-left wheel turning radius correspondence torque calculating unit 514 is processing to be executed by the CPU of the control unit 5 as the first torque calculator 51. Processing to be executed by each of a steering velocity calculating unit 521, a filter unit 522, and a right-and-left wheel steering velocity response torque calculating unit 523 is processing to be executed by the CPU as the second torque calculator 52. Processing to be executed by each of a turning direction determining unit 531 and a right-and-left wheel target torque calculating unit 532 is processing to be executed by the CPU as the corrector 53. Processing to be executed by each of a command current calculating unit 541 and a pulse width modulation (PWM) signal generating unit 542 is processing to be executed by the CPU as the current controller 54.

The control unit 5 repeatedly executes those types of processing in every predetermined calculation period (for example, 5 ms). The following description is directed to a case where the corrector 53 calculates a corrected torque by correcting the turning radius correspondence torque of the wheel on the inner side of turning so that the turning radius correspondence torque decreases in accordance with the steering velocity response torque and calculates a corrected torque by correcting the turning radius correspondence torque of the wheel on the outer side of turning so that the turning radius correspondence torque increases in accordance with the steering velocity response torque, and the current controller 54 supplies currents for operating the first and second torque couplings 4A and 4B so that the corrected torques obtained through the correction executed by the corrector 53 are transmitted to the wheel on the inner side of turning and the wheel on the outer side of turning.

The turning radius calculating unit 511 estimates and calculates a turning radius of the four-wheel drive vehicle 100 based on wheel speed signals that are the detection results from the rotation speed sensors 111 to 114 and a steering angle signal that is the detection result from the steering angle sensor 115.

The target slip angle calculating unit 512 calculates a target slip angle when the four-wheel drive vehicle 100 makes a turn based on the turning radius calculated by the turning radius calculating unit 511, the wheel speed signals, and an accelerator operation amount signal that is the detection result from the accelerator operation amount sensor 116. The slip angle herein refers to an angle formed between a central axis along a longitudinal direction of the four-wheel drive vehicle 100 (direction orthogonal to a vehicle width direction) and an actual traveling direction of the four-wheel drive vehicle 100. The target slip angle refers to a slip angle that is suitable for the four-wheel drive vehicle 100 to travel along an arc having the turning radius calculated by the turning radius calculating unit 511.

Figure 4:
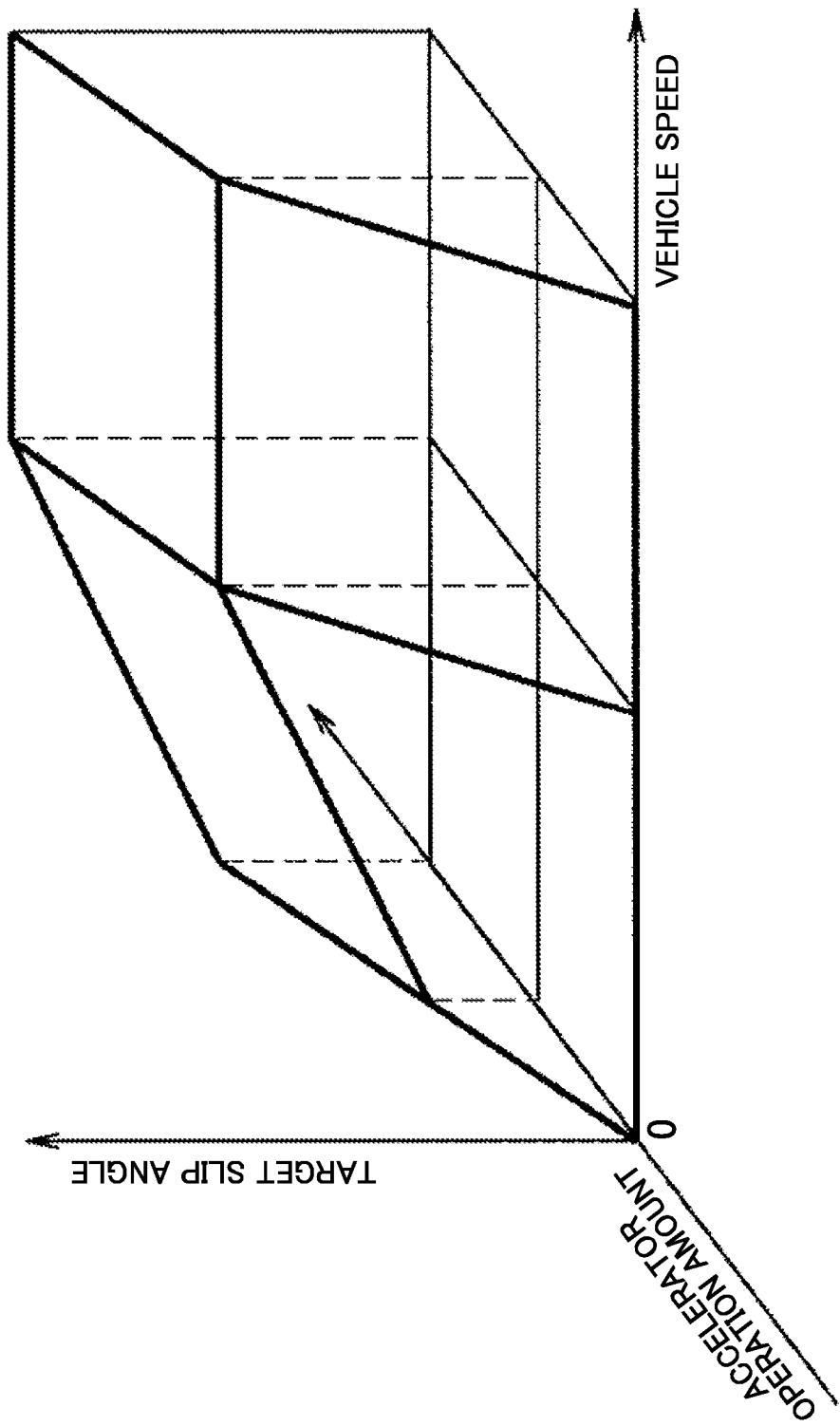
FIG. 4 is a map indicating a relationship between each of a vehicle speed and an accelerator operation amount and a target slip angle.

The target slip angle can be obtained through calculation based on, for example, the vehicle speed and the accelerator operation amount. FIG. 4 is an example of a map indicating a relationship between each of the vehicle speed and the accelerator operation amount and the target slip angle. Referring to this map, the target slip angle calculating unit 512 sets a larger target slip angle as the vehicle speed increases and as the accelerator operation amount increases.

The target slip angle calculating unit 512 stores a plurality of maps indicating the relationship between each of the vehicle speed and the accelerator operation amount and the target slip angle, and calculates the target slip angle through linear interpolation or by selecting any one map out of the plurality of maps based on the turning radius calculated by the turning radius calculating unit 511. The target slip angle calculating unit 512 may correct the target slip angle based on a coefficient of friction of a road surface. In this case, the target slip angle calculating unit 512 corrects the target slip angle so that the target slip angle increases as the coefficient of friction of the road surface decreases. The target slip angle calculating unit 512 may correct the target slip angle based on a centrifugal force applied to the four-wheel drive vehicle 100.

The right-and-left wheel target wheel speed calculating unit 513 calculates target rotation speeds of the right and left rear wheels 105*b* and 105*a* based on the wheel speed signals, the turning radius calculated by the turning radius calculating unit 511, and the target slip angle calculated by the target slip angle calculating unit 512. The target rotation speed herein refers to a rotation speed of each of the right and left rear wheels 105*b* and 105*a* when the four-wheel drive vehicle 100 travels with the turning radius calculated by the turning radius calculating unit 511 and the target slip angle calculated by the target slip angle calculating unit 512 at a vehicle speed obtained based on the rotation speeds of the right and left front wheels 104*b* and 104*a* and the right and left rear wheels 105*b* and 105*a*.

The right-and-left wheel turning radius correspondence torque calculating unit 514 calculates turning radius correspondence torques indicating the magnitudes of the driving forces to be transmitted to the right and left rear wheels 105*b* and 105*a* based on the wheel speed signals and the target rotation speeds calculated by the right-and-left wheel target wheel speed calculating unit 513. Specifically, when the rotation speed of the left rear wheel 105*a* that is detected by the rotation speed sensor 113 is lower than the target rotation speed, the right-and-left wheel turning radius correspondence torque calculating unit 514 increases the turning radius correspondence torque of the left rear wheel 105*a*. When the rotation speed of the left rear wheel 105*a* that is detected by the rotation speed sensor 113 is higher than the target rotation speed, the right-and-left wheel turning radius correspondence torque calculating unit 514 reduces the turning radius correspondence torque of the left rear wheel 105*a*. The same applies to the right rear wheel 105*b*.

The steering velocity calculating unit 521 calculates a steering velocity that is a rotational angular velocity of the steering wheel 109 by determining a time derivative of a steering angle obtained based on the steering angle signal. The filter unit 522 executes filtering processing for the steering velocity output from the steering velocity calculating unit 521 to reduce its change so that the steering velocity response torques to be calculated by the right-and-left wheel steering velocity response torque calculating unit 523 at the subsequent stage do not fluctuate abruptly. Specifically, as the processing to be executed by the filter unit 522, the steering velocity is output by averaging the values of the steering velocity calculated in the respective calculation periods within a range of, for example, 200 to 400 ms. The time range of the moving average may be a fixed value, or may be changed as necessary based on, for example, the vehicle speed. When the time range of the moving average is changed based on the vehicle speed, it is preferable to reduce the time range of the moving average as the vehicle speed increases.

The right-and-left wheel steering velocity response torque calculating unit 523 calculates steering velocity response torques of the right and left rear wheels 105*b* and 105*a* based on the steering velocity subjected to the filtering processing executed by the filter unit 522 and the wheel speed signals. The steering velocity response torque is set to a larger value as the steering velocity increases and as the vehicle speed obtained based on the wheel speed signals decreases.

Figure 5:
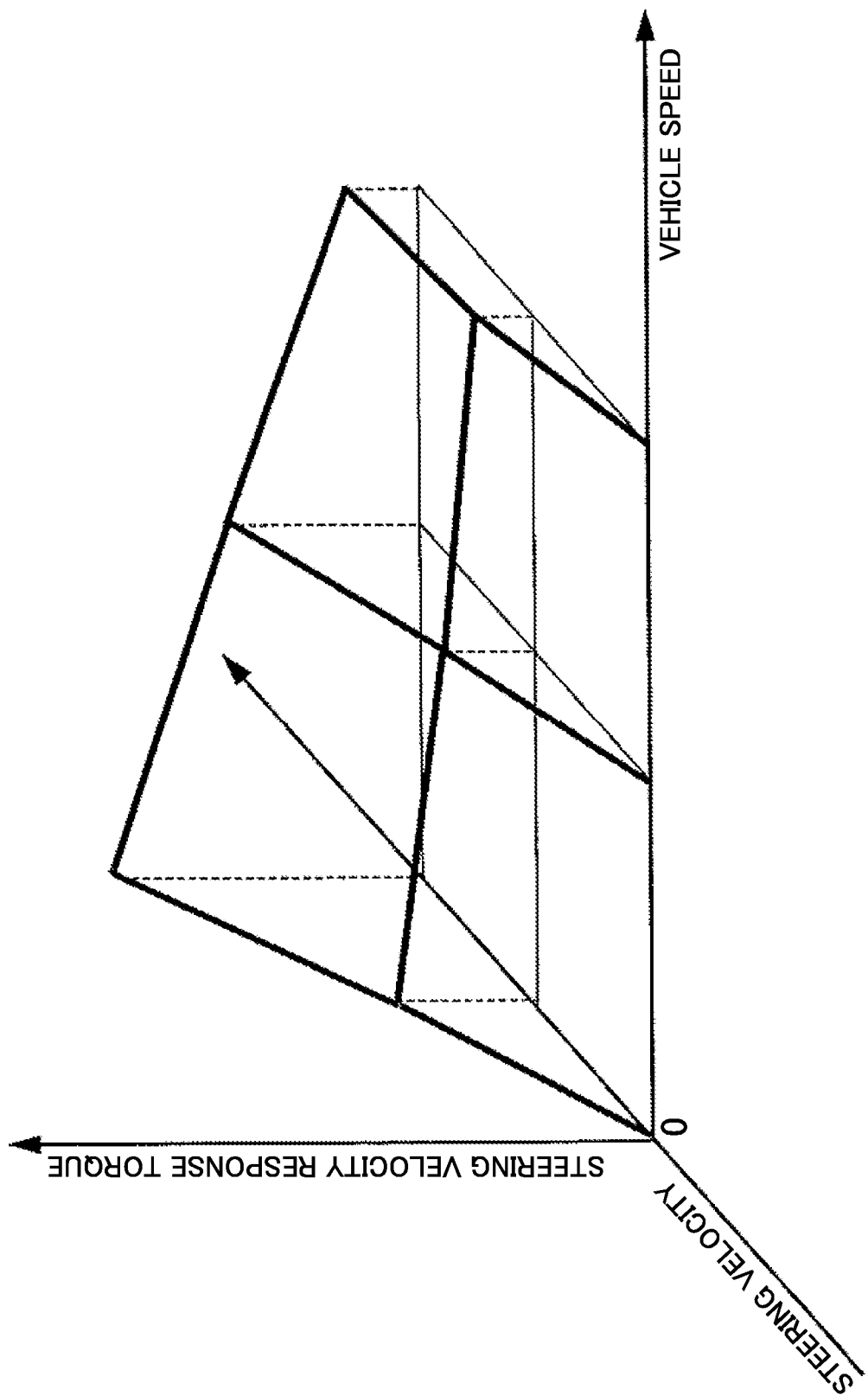
FIG. 5 is a map indicating a relationship between each of the vehicle speed and a steering velocity and a steering velocity response torque.

FIG. 5 is an example of a map indicating a relationship between each of the vehicle speed and the steering velocity (filtered value that is an output value from the filter unit 522) and the steering velocity response torque. Referring to this map, the right-and-left wheel steering velocity response torque calculating unit 523 sets the steering velocity response torque to a larger value as the steering velocity increases and as the vehicle speed decreases.

The turning direction determining unit 531 determines the turning direction of the four-wheel drive vehicle 100, that is, whether the four-wheel drive vehicle 100 is making a turn to the right or left based on the steering angle signal. This determination can be made by determining, for example, whether the steering wheel 109 is steered rightward or leftward from its neutral position based on the steering angle signal. The turning direction may be determined in consideration of a yaw rate and a lateral acceleration of the vehicle body 101. By determining the turning direction with the yaw rate and the lateral acceleration, the behavior of the vehicle can be stabilized even during countersteering in which the turning direction and the steering direction have an opposite relationship.

The right-and-left wheel target torque calculating unit 532 calculates target torques indicating the magnitudes of the driving forces to be transmitted to the right rear wheel 105b and the left rear wheel 105a based on the turning radius correspondence torques calculated by the right-and-left wheel turning radius correspondence torque calculating unit 514, the steering velocity response torques calculated by the right-and-left wheel steering velocity response torque calculating unit 523, and the steering direction determined by the turning direction determining unit 531. In this calculation, when the turning direction is a rightward direction, the target torque of the right rear wheel 105b is calculated by subtracting the steering velocity response torque from the turning radius correspondence torque of the right rear wheel 105b, and the target torque of the left rear wheel 105a is calculated by adding the steering velocity response torque to the turning radius correspondence torque of the left rear wheel 105a. When the turning direction is a leftward direction, the target torque of the right rear wheel 105b is calculated by adding the steering velocity response torque to the turning radius correspondence torque of the right rear wheel 105b, and the target torque of the left rear wheel 105a is calculated by subtracting the steering velocity response torque from the turning radius correspondence torque of the left rear wheel 105a.

The description is herein given of the case where the magnitude of the steering velocity response torque to be subtracted from the turning radius correspondence torque of the wheel on the inner side of turning is equal to the magnitude of the steering velocity response torque to be added to the turning radius correspondence torque of the wheel on the outer side of turning. A difference may be provided between the magnitudes. In this case, it is desirable that the magnitude of the steering velocity response torque to be subtracted from the turning radius correspondence torque of the wheel on the inner side of turning be larger than the magnitude of the steering velocity response torque to be added to the turning radius correspondence torque of the wheel on the outer side of turning.

The right-and-left wheel target torque calculating unit 532 may execute the processing of adding and subtracting the steering velocity response torques to and from the turning radius correspondence torques only when a predetermined condition is satisfied. For example, the predetermined condition is that the absolute value of the steering angle is equal to or larger than a predetermined value (for example, 30°). A condition that the accelerator operation amount is equal to or larger than a predetermined value or a mode that requires high traveling performance (sport mode) is selected through a driver's operation of a shift lever or the like may be added as the predetermined condition.

When the steering wheel 109 is steered toward its neutral position during countersteering, the right-and-left wheel target torque calculating unit 532 may set the target torques so that a driving force greater than that of the wheel on the outer side of turning is transmitted to the wheel on the inner side of turning in order to stabilize the behavior of the vehicle promptly.

The command current calculating unit 541 calculates command currents that are command values of currents to be supplied to the coils 421 of the second and first torque couplings 4B and 4A so that driving forces based on the target torques calculated by the right-and-left wheel target torque calculating unit 532 are transmitted to the right rear wheel 105b and the left rear wheel 105a from the second and first torque couplings 4B and 4A, respectively.

The PWM signal generating unit 542 generates a PWM signal for turning ON or OFF the switching elements of the inverter circuit 6 based on the command currents calculated by the command current calculating unit 541. The duty ratio of the PWM signal increases as the command currents increase. The PWM signal generating unit 542 executes feedback control so that exciting currents corresponding to the command currents are supplied to the coils 421 based on detection results from current sensors 55 and 56 configured to detect the magnitudes of the currents supplied from the inverter circuit 6 to the coils 421 of the first and second torque couplings 4A and 4B.

Figure 6B:
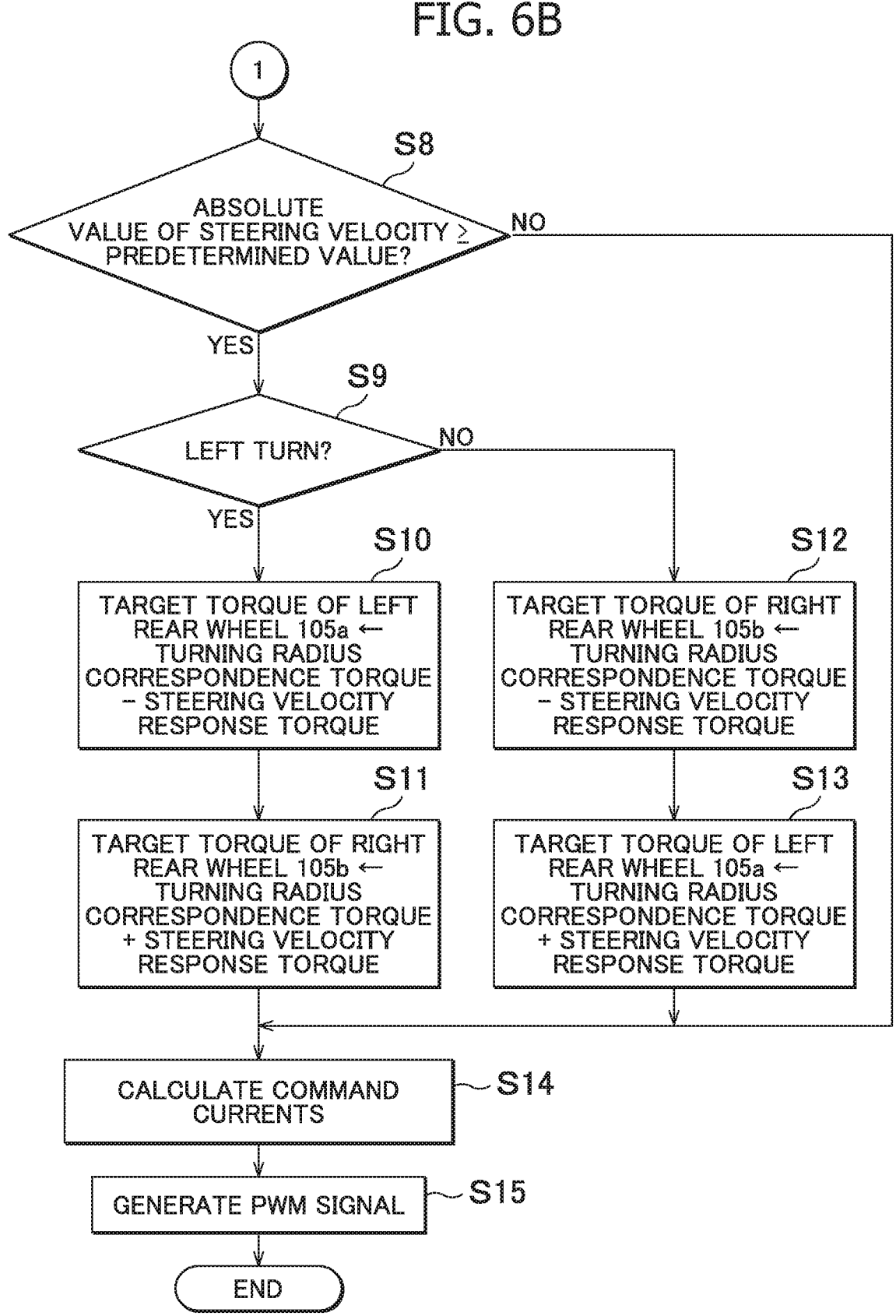

FIGS. 6A and 6B include a flowchart illustrating an example of a procedure of the processing to be executed by the control unit 5 in one calculation period. This flowchart illustrates a case of executing the processing of adding and subtracting the steering velocity response torques to and from the turning radius correspondence torques when the absolute value of the steering angle is equal to or larger than a predetermined value.

The control unit 5 calculates a turning radius based on wheel speed signals and a steering angle signal (Step S1), and calculates a target slip angle based on the turning radius, the wheel speed signals, and an accelerator operation amount signal (Step S2). The control unit 5 calculates target rotation speeds of the right and left rear wheels 105b and 105a based on the wheel speed signals, the turning radius, and the target slip angle (Step S3), and calculates turning radius correspondence torques based on the wheel speed signals and the target rotation speeds (Step S4). The processing of Steps S1 to S4 is the processing to be executed by the control unit 5 as the first torque calculator 51.

Next, the control unit 5 calculates a steering velocity based on the steering angle signal (Step S5), executes filtering processing for the steering velocity (Step S6), and calculates steering velocity response torques based on the steering velocity subjected to the filtering processing and the wheel speed signals (Step S7). The processing of Steps S5 to S7 is the processing to be executed by the control unit 5 as the second torque calculator 52.

Next, the control unit 5 determines whether the absolute value of the steering velocity is equal to or larger than a predetermined value (Step S8). When the absolute value of the steering velocity is equal to or larger than the predetermined value (S8: Yes), the control unit 5 determines whether the turning direction is a leftward direction (Step S9). When the turning direction is the leftward direction (S9: Yes), the control unit 5 calculates a target torque of the left rear wheel 105a on an inner side of turning by subtracting the steering velocity response torque from the turning radius correspondence torque of the left rear wheel 105a (Step S10), and calculates a target torque of the right rear wheel 105b on an outer side of turning by adding the steering velocity response torque to the turning radius correspondence torque of the right rear wheel 105b (Step S11). When the turning direction is a rightward direction (S9: No), the control unit 5 calculates a target torque of the right rear wheel 105*b* on the inner side of turning by subtracting the steering velocity response torque from the turning radius correspondence torque of the right rear wheel 105*b* (Step S12), and calculates a target torque of the left rear wheel 105*a* on the outer side of turning by adding the steering velocity response torque to the turning radius correspondence torque of the left rear wheel 105*a* (Step S13). When the absolute value of the steering velocity is not equal to or larger than the predetermined value (S8: No), the processing of Steps S9 to S13 is not executed. The processing of Steps S8 to S13 is the processing to be executed by the control unit 5 as the corrector 53.

Next, the control unit 5 calculates command currents based on the target torques of the right rear wheel 105*b* and the left rear wheel 105*a* (Step S14). The control unit 5 generates a PWM signal based on the command currents, and outputs the PWM signal to the inverter circuit 6 (Step S15). The processing of Steps S14 and S15 is the processing to be executed by the control unit 5 as the current controller 54.

According to the embodiment described above, when the four-wheel drive vehicle 100 makes a turn, the driving force to be transmitted to the wheel on the inner side of turning decreases in accordance with the steering velocity, and the driving force to be transmitted to the wheel on the outer side of turning increases in accordance with the steering velocity. Therefore, the four-wheel drive vehicle 100 can easily make a turn in the direction in which the steering wheel 109 is steered, whereby a time delay can be reduced from a steering operation of the steering wheel 109 to a change in the behavior of the vehicle. Thus, the turning performance of the four-wheel drive vehicle 100 is improved. When the driving force to be transmitted to the wheel on the outer side of turning is increased in accordance with the steering velocity, the turning performance can further be improved.

According to this embodiment, the turning radius correspondence torques are corrected by adding and subtracting the steering velocity response torques only while the steering wheel 109 is rotating, and the steering velocity response torques are not added to and subtracted from the turning radius correspondence torques while the four-wheel drive vehicle 100 is making a turn at a constant steering angle. Thus, it is possible to avoid an excessive change in the behavior of the four-wheel drive vehicle 100.

In the embodiment described above, description is given of the case where the corrector 53 calculates a corrected torque by correcting the turning radius correspondence torque of the wheel on the inner side of turning so that the turning radius correspondence torque decreases in accordance with the steering velocity response torque and calculates a corrected torque by correcting the turning radius correspondence torque of the wheel on the outer side of turning so that the turning radius correspondence torque increases in accordance with the steering velocity response torque. The corrector 53 may correct only the turning radius correspondence torque of any one of the wheels on the inner side of turning and on the outer side of turning. Also in this case, the four-wheel drive vehicle 100 can easily make a turn in the direction in which the steering wheel 109 is steered, whereby the time delay can be reduced from the steering operation of the steering wheel 109 to the change in the behavior of the vehicle.

The present invention may be modified as appropriate without departing from the spirit of the present invention. For example, in the embodiment described above, description is given of the case where the right and left front wheels 104*b* and 104*a* are the main driving wheels and the right and left rear wheels 105*b* and 105*a* are the auxiliary driving wheels. The present invention is also applicable to a four-wheel drive vehicle in which the right and left rear wheels 105*b* and 105*a* are conversely the main driving wheels and the right and left front wheels 104*b* and 104*a* are conversely the auxiliary driving wheels.

What is claimed is:

1. A driving force control apparatus to be mounted on a vehicle including a driving force transmission apparatus including a driving force adjustment mechanism configured to adjust driving forces to be transmitted to a right wheel and a left wheel, the driving force control apparatus being configured to control the driving force transmission apparatus, the driving force control apparatus comprising:
   a first torque calculator configured to calculate turning radius correspondence torques indicating magnitudes of the driving forces to be transmitted to the right wheel and the left wheel based on at least a vehicle turning radius;
   a second torque calculator configured to calculate a steering velocity response torque based on a steering velocity of a steering wheel and a vehicle speed;
   a corrector configured to calculate a corrected torque by correcting a turning radius correspondence torque of a wheel on an inner side of turning out of the turning radius correspondence torques of the right wheel and the left wheel that are calculated by the first torque calculator so that the turning radius correspondence torque of the wheel on the inner side of turning decreases in accordance with the steering velocity response torque; and
   a current controller configured to supply, to the driving force transmission apparatus, a current for operating the driving force adjustment mechanism so that a driving force based on the corrected torque is transmitted to the wheel on the inner side of turning.

2. The driving force control apparatus according to claim 1, wherein
   the corrector is configured to calculate the corrected torque by correcting the turning radius correspondence torque of the wheel on the inner side of turning so that the turning radius correspondence torque of the wheel on the inner side of turning decreases in accordance with the steering velocity response torque, and to calculate the corrected torque by correcting the turning radius correspondence torque of the wheel on the outer side of turning so that the turning radius correspondence torque of the wheel on the outer side of turning increases in accordance with the steering velocity response torque, and
   the current controller is configured to supply, to the driving force transmission apparatus, a current for operating the driving force adjustment mechanism so that the corrected torques obtained through correction executed by the corrector are transmitted to the wheel on the inner side of turning and the wheel on the outer side of turning.

3. A driving force control apparatus to be mounted on a vehicle including a driving force transmission apparatus including a driving force adjustment mechanism configured to adjust driving forces to be transmitted to a right wheel and a left wheel, the driving force control apparatus being configured to control the driving force transmission apparatus, the driving force control apparatus comprising:
   a first torque calculator configured to calculate turning radius correspondence torques indicating magnitudes of the driving forces to be transmitted to the right wheel and the left wheel based on at least a vehicle turning radius;
a second torque calculator configured to calculate a steering velocity response torque based on a steering velocity of a steering wheel and a vehicle speed;
a corrector configured to calculate a corrected torque by correcting a turning radius correspondence torque of a wheel on an outer side of turning out of the turning radius correspondence torques of the right wheel and the left wheel that are calculated by the first torque calculator so that the turning radius correspondence torque of the wheel on the outer side of turning increases in accordance with the steering velocity response torque; and
a current controller configured to supply, to the driving force transmission apparatus, a current for operating the driving force adjustment mechanism so that a driving force based on the corrected torque is transmitted to the wheel on the outer side of turning.

4. A method for controlling a vehicle including a driving force transmission apparatus including a driving force adjustment mechanism configured to adjust driving forces to be transmitted to a right wheel and a left wheel, the method comprising:
calculating turning radius correspondence torques indicating magnitudes of the driving forces to be transmitted to the right wheel and the left wheel based on at least a vehicle turning radius;
calculating a steering velocity response torque based on a steering velocity of a steering wheel and a vehicle speed;
calculating a corrected torque by correcting a turning radius correspondence torque of a wheel on an inner side of turning out of the turning radius correspondence torques of the right wheel and the left wheel so that the turning radius correspondence torque of the wheel on the inner side of turning decreases in accordance with the steering velocity response torque; and
supplying, to the driving force transmission apparatus, a current for operating the driving force adjustment mechanism so that a driving force based on the corrected torque is transmitted to the wheel on the inner side of turning.

5. The method for controlling a vehicle according to claim 4, further comprising:
calculating the corrected torque by correcting the turning radius correspondence torque of the wheel on the inner side of turning so that the turning radius correspondence torque of the wheel on the inner side of turning decreases in accordance with the steering velocity response torque, and calculating the corrected torque by correcting the turning radius correspondence torque of the wheel on the outer side of turning so that the turning radius correspondence torque of the wheel on the outer side of turning increases in accordance with the steering velocity response torque; and
supplying, to the driving force transmission apparatus, a current for operating the driving force adjustment mechanism so that the corrected torques are transmitted to the wheel on the inner side of turning and the wheel on the outer side of turning.

6. A method for controlling a vehicle including a driving force transmission apparatus including a driving force adjustment mechanism configured to adjust driving forces to be transmitted to a right wheel and a left wheel, the method comprising:
calculating turning radius correspondence torques indicating magnitudes of the driving forces to be transmitted to the right wheel and the left wheel based on at least a vehicle turning radius;
calculating a steering velocity response torque based on a steering velocity of a steering wheel and a vehicle speed;
calculating a corrected torque by correcting a turning radius correspondence torque of a wheel on an outer side of turning out of the turning radius correspondence torques of the right wheel and the left wheel so that the turning radius correspondence torque of the wheel on the outer side of turning increases in accordance with the steering velocity response torque; and
supplying, to the driving force transmission apparatus, a current for operating the driving force adjustment mechanism so that a driving force based on the corrected torque is transmitted to the wheel on the outer side of turning.

* * * * *